United States Patent Office.

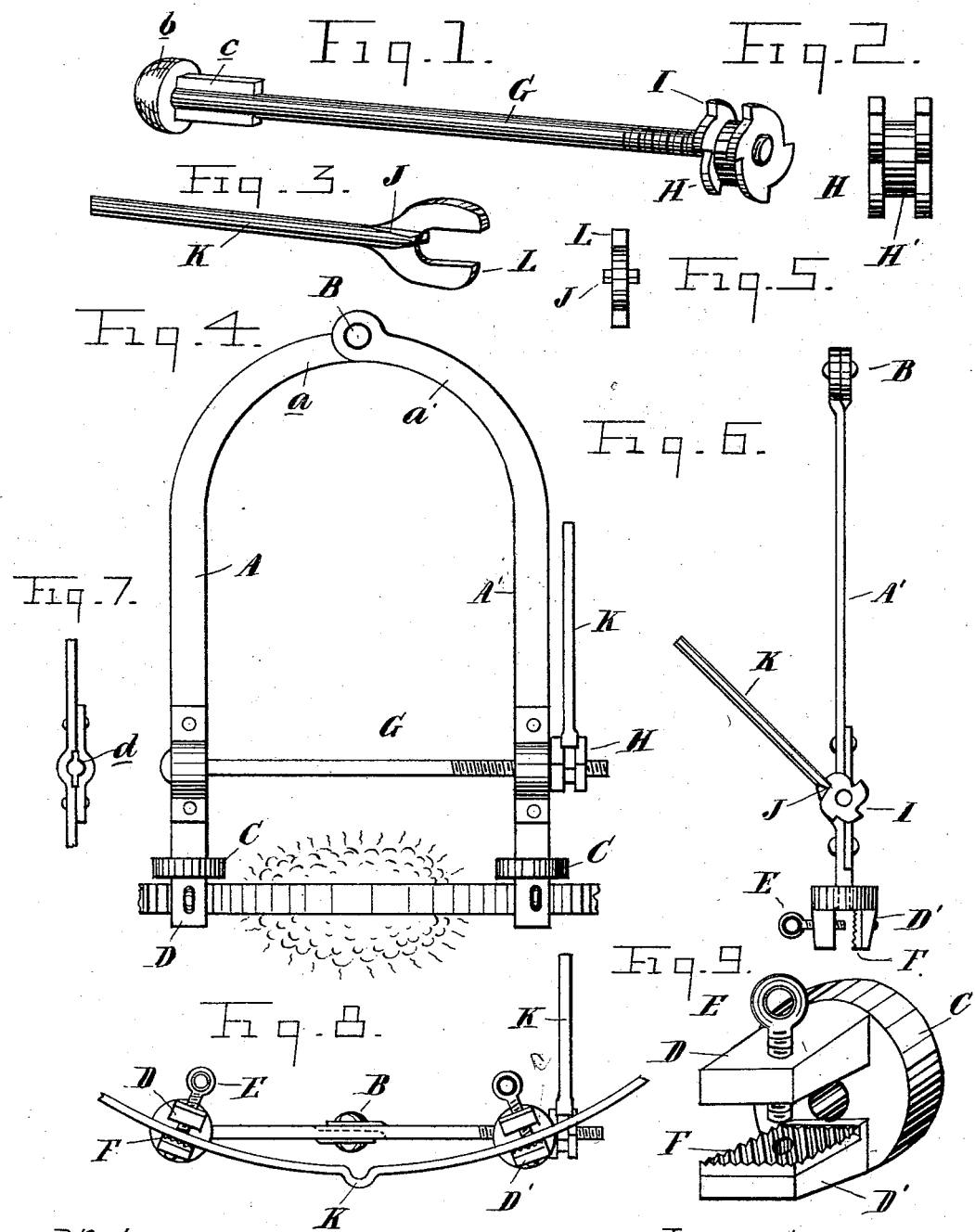

FLOYD HEAVENER, OF HELENA, MONTANA.

MACHINE FOR SETTING TIRES.

SPECIFICATION forming part of Letters Patent No. 464,302, dated December 1, 1891.

Application filed May 27, 1891. Serial No. 394,321. (No model.)

*To all whom it may concern:*

Be it known that I, FLOYD HEAVENER, a citizen of the United States, residing at Helena, in the county of Lewis and Clarke, and State of Montana, have invented certain new and useful Improvements in Machines for Setting Tires, of which the following is a specification, reference being had therein to the accompanying drawings.

This invention relates to new and useful improvements in a machine for setting tires; and the invention consists in the peculiar construction of two clamps secured to arms which are pivoted together and having means for causing the clamps to approach each other to crimp and bend the metal between the clamps, whereby it may be heated and forged into the proper shape to take up this crimp or bend.

The invention further consists in the peculiar construction, arrangement, and combination of the various parts, all as more fully hereinafter described.

In the drawings, Figure 1 is a detached perspective view of the clamping-bolt. Fig. 2 is a side elevation of the ratcheted nut thereon. Fig. 3 is a perspective view of the spanner to be used on said nut. Fig. 4 is a side elevation of my improved machine. Fig. 5 is an end elevation of the spanner. Fig. 6 is a side elevation of the setting-machine. Fig. 7 is a side elevation of the socket for the end of the clamping-bolt. Fig. 8 is an end elevation of the machine. Fig. 9 is a detached perspective view of the clamp.

A A' are two arms having the curved portion $a\ a'$ to allow of their being pivoted together at B and the portions A A' to extend parallel to each other, forming altogether a yoke-shaped supporting-frame. To the outer ends of these arms are centrally pivoted the clamps, consisting of the supporting-block C, the stationary jaws D D', and the clamping-screw E. The jaw D' is provided with a movable serrated face F, against which the screw E clamps the tire to be set, the block C being centrally pivoted to the end of the arm. It is evident that this clamp may be turned at any desired angle to the arm to accommodate tires of different diameter. G is a bar connecting the said arms, provided at one end with a head $b$ and spline $c$, which are adapted to engage in the bearing $d$, formed in the arm A'. The other end of the bar G is screw-threaded and passes through an aperture in the arm A. Outside of the arm a nut H engages the connecting-bar. This nut is provided with the ratchet I upon opposite sides thereof, with which the lugs J upon the spanner K are adapted to engage, the jaws L of said spanner being adapted to fit centrally the hub portion H of said nut.

The tire being secured between the clamps, as plainly shown in Fig. 8, the operator engages the spanner with the nut H and turns the same after the metal is heated until a crimp or bend—such as K—is formed centrally between the clamps, this clamp taking up sufficient metal to reduce the tire to the proper diameter. While still heated this may be hammered, the clamps holding the tire in the proper position during this operation.

With a tool of this kind I am enabled to secure the tire in position, heat it, and take up the necessary length while hot by hammering out the bend. This is all accomplished with a machine which is easily handled and can be conveniently used in any blacksmith's shop.

What I claim as my invention is—

1. In a machine for setting tires, the combination of two arms hinged together at one end, of clamps at the other end, of a bar connecting said arms, and means for causing said arms to approach each other, substantially as described.

2. In a machine for setting tires, the combination of two arms hinged together at one end, of clamps at the other end, of a bar connecting said arms, a ratcheted nut engaging a screw-thread on said bar, and a spanner for rotating said nut, substantially as described.

3. In a machine for setting tires, the combination of two arms hinged together at one end, of swiveled clamps at the other end of each arm, a bar connecting said arms near the clamp, a ratcheted nut engaging a screw-thread on said bar, and a spanner for rotating said nut, substantially as described.

4. In a machine for setting tires, the combination, with the arms A A', having the curved portions $a\ a'$, hinged together at B, of the blocks C, pivoted at the ends of said arms, the jaws on said blocks connecting the bar, and means for causing said arms to approach each other, substantially as described.

5. In a machine for setting tires, the combination of the arms A A', the clamp pivoted at the end thereof, the connecting-bar G, having the head b, the spine c, the bearing d in the arm A', the screw-threaded portion of the connecting-bar passing through the arm A, the nut H, having the ratcheted portions I, the spanner K, having the jaws L, and lugs J, substantially as described.

In testimony whereof I affix my signature in presence of two witnesses.

FLOYD HEAVENER.

Witnesses:
JOSEPH H. BACON,
J. MILLER SMITH.